(12) United States Patent
Kelly

(10) Patent No.: US 6,861,090 B2
(45) Date of Patent: Mar. 1, 2005

(54) SURFACE FINISH OF CEMENTITIOUS NATURE AND CONTAINING GLASS BEADS

(75) Inventor: Luke Gregory Kelly, Sydney (AU)

(73) Assignee: Beadcrete Pty., Ltd., Castle Hill (AU)

(*) Notice: Subject to any disclaimer, the term of this patent is extended or adjusted under 35 U.S.C. 154(b) by 0 days.

(21) Appl. No.: 10/779,895

(22) Filed: Feb. 17, 2004

(65) Prior Publication Data
US 2004/0161540 A1 Aug. 19, 2004

Related U.S. Application Data

(60) Division of application No. 09/993,529, filed on Nov. 14, 2001, now Pat. No. 6,692,566, which is a continuation-in-part of application No. 09/335,021, filed on Jun. 17, 1999, now abandoned, which is a continuation-in-part of application No. 08/693,298, filed as application No. PCT/AU96/00075 on Feb. 16, 1995, now abandoned.

(30) Foreign Application Priority Data

Feb. 16, 1994 (AU) .............................. PM3887
Aug. 16, 1996 (WO) .............................. PCT/AU95/00075

(51) Int. Cl.$^7$ .................................................. B05D 5/06
(52) U.S. Cl. ........................ 427/137; 427/201; 427/180
(58) Field of Search ................................ 427/136–137, 427/157, 180, 201, 376.2, 372.2

(56) References Cited

U.S. PATENT DOCUMENTS

| | | | | |
|---|---|---|---|---|
| 4,844,964 A | * | 7/1989 | Jurrus | 428/74 |
| 5,660,497 A | * | 8/1997 | Kozak et al. | 404/14 |
| 2001/0010858 A1 | * | 8/2001 | Uchiya et al. | 428/147 |
| 2002/0198291 A1 | * | 12/2002 | Frenkel | 524/2 |

* cited by examiner

Primary Examiner—Fred J. Parker
(74) Attorney, Agent, or Firm—Frank J. McGue

(57) ABSTRACT

A method for applying a surface finish to a substrate comprises forming a matrix from a combination of at least a cementitious material, water and glass beads of either the same size or a blend of at least two different sizes and an adhesive. The adhesive includes a concrete fortifier and a silicone.

7 Claims, 2 Drawing Sheets

SURFACE FINISH OF CEMENTITIOUS NATURE AND CONTAINING GLASS BEADS

RELATION APPLICATIONS

This application is a divisional of application Ser. No. 09/993,529 filed Nov. 14, 2001, now U.S. Pat. No. 6,692,566, which is a continuation-in-part of Ser. No. 09/335,021 filed Jun. 17, 1999 now abandoned which is a continuation-in-part of Ser. No. 08/693,298 filed Oct. 30, 1996, now abandoned, which is a Section 371 continuation of PCT/AU96/00075 filed Feb. 16, 1995.

TECHNICAL FIELD

The present invention relates to surface finishes for pathways, walls, swimming pools and other structures and more particularly relates to a surface finish which is of a cementitious nature and which includes at least one aggregate type comprising glass beads. More particularly, the invention relates to a mix forming and to a method of producing the finishes.

BACKGROUND OF THE INVENTION

In the building industry there has been prolific use of aggregate surfaces for paving footpaths, surfacing of prefabricated building panels and slabs to provide attractive and functional facades and in and around swimming pools and the like. The known aggregate mixes have invariably utilized aggregate materials which include stones, pebbles and the like mixed in a matrix of cementitious material selected from cement or resin.

The selection of pebbles and stones as the aggregate material usually dictates the appearance of the finish particularly with respect to its color and texture. When resins are used, the aggregate provides the final surface coloration as the cementitious resins are generally clear. An alternative surface coating may be formed by using colored mortar with pebbles and stones.

Despite the use of a wide range of aggregates to produce a variety of surface finishes successfully preparing a cementitious surface matrix using as the aggregate material glass beads either alone or with another aggregate materials selected from precious or semi-precious stones, sands, quartz, marble, granites and the like has been difficult to achieve. It was previously thought to be unsatisfactory to attempt to use other than conventional aggregates in hard wearing surface finishes as the bonding achieved was inferior compared with conventional aggregates. In the building industry it has been considered unwise to use materials such as glass beads as aggregates as the glass is generally considered to be insufficiently porous or rough enough to establish an effective bond. The bond is also compromised by alkalinity bleed out from the glass beads.

The present invention overcomes the effective use of alternative aggregates and particularly glass beads in which the problems of poor bonding known in the prior art aggregates is overcome.

SUMMARY OF THE INVENTION

In the broadest form of the apparatus aspect the present invention comprises; a surface finish for application to a vertical, horizontal or sloping surface/s of a structure or object which provides a substrate for said surface finish, the surface finish comprising; a matrix formed from a combination of at least a cementitious material, water, glass beads of either the same or different sizes and an adhesive.

In the preferred embodiment, the surface finish comprises a blended matrix of cementitious mortar, an aggregate of glass beads of the same or different sizes used alone or in conjunction with other aggregates selected from precious stones, semiprecious stones or raw stones and liquid adhesive comprising a combination of a silicone and a concrete fortifier for enhancing the bond between the cementitious mortar and glass beads.

The finish may be applied to the surface of a structure such as a building facade, as a paving surface or simply to almost any object formed from a material capable of forming a bond with the finish.

The consistency and/or blend of the matrix may be varied according to the nature of the substrate surface to which the surface coating is applied. Thus the mix will vary according to whether or not the surface is horizontal, vertical or sloped and according to the type of material which forms the substrate. For instance, application of the finish to a vertical surface requires the mix to bind to the surface and this is achieved by ensuring that the mix assumes the right paste consistency.

According to the method aspect, the present invention also provides a method of preparing a surface finish comprising the steps of; a) mixing a cementitious mortar with water and a liquid or powdered adhesive, b) introducing glass beads into the mix alone or with another aggregate, c) blending the mix for a pre-selected duration until the mix reaches a predetermined consistency, d) applying the mix to a substrate surface of a structure or other object, e) allowing the mix to soft set, f) exposing a predetermined surface area of the beads by either washing or sponging the surface of the finish with water; or g) allowing the mix to hard set and washing with hydrochloric acid.

In the broadest form of the method aspect, the present invention comprises a method for producing a surface finish on the surface of a structure or other object as hereinbefore described comprising the steps of; a) selecting a cementitious material, b) selecting glass beads from within the size range of 0.1 mm to 200 mm, c) adding an adhesive to the mix, d) mixing the cementitious material with the selected bead sizes and water until the mix reaches a predetermined consistency, e) applying the matrix so formed to the surface of a structure, f) washing away part of the cementitious material such that 30–60% of the surface area of a substantial number of the glass beads on the surface of the matrix is exposed, g) allowing the surface finish to set.

According to the preferred embodiment of the method aspect the adhesive comprises a silicone and a concrete fortifier mixed together.

According to a preferred embodiment the aggregate bead/cement ratio is 5:8 or five part beads to 3 parts cement. Alternatively, the bead/cement ratio may be 8:5.

BRIEF DESCRIPTION OF THE DRAWINGS

The present invention will now be described in all its aspects and in more detail according to preferred but non-limiting embodiments and with reference to the accompanying illustrations wherein.

DETAILED DESCRIPTION OF THE INVENTION

According to a preferred embodiment the surface finish of the present invention comprises a matrix of cement, water, an adhesive and glass beads forming the aggregate material.

The adhesive is introduced into the mix with the water to facilitate bonding between the glass beads and the mortar. For this purpose known adhesives may be used with such additives as a concrete fortifier mixed with a silicone to provide a mechanical locking and thus binding between the beads and the mortar. In the present application, the term "concrete fortifier" refers to such materials as XYCRYLIC ADMIX™ available from Xypex Corporation of Lavington, N. S. W., Australia which is an acrylic polymer formulation designed for use as a concrete admix which causes a catalytic reaction when mixed with water to generates a nonsoluble crystalline formation of dendritic fibers within the pores and capillary tracts of concrete.

In utilizing the surface finish of the present invention, many variations of aggregate mix can be achieved to provide different aesthetic, bonding and structural effects. The blend proportions and constituents over and above the essential constituents are primarily determined by the particular application of the surface coating and more particularly whether it would be used on a horizontal, vertical or sloping substrate surface. The nature and quality of the substrate material is also a determinant of the mix.

Figure 1:
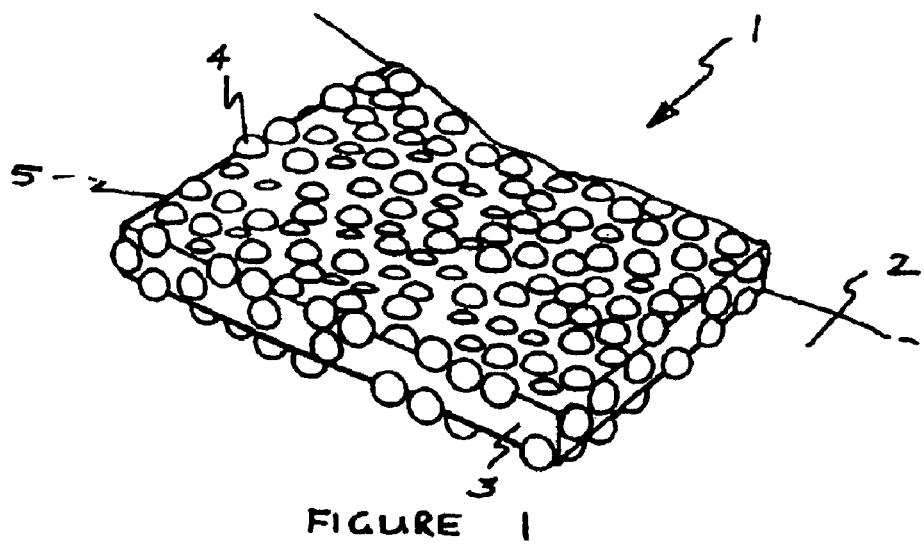
FIG. 1 shows a structural element including the surface finish according to one embodiment of the invention.

Referring to FIG. 1 there is shown a surface finish 1 applied to the surface of a structural element 2. Surface finish 1 comprises a matrix formed from at least a cementitious material 3 and water into which is mixed spherical glass beads 4 which may be of the same or different sizes. Preferably, the beads fall within a size range 0.1 mm to 200 mm but the ideal range from which beads would be selected and thus the most commonly used beads would be in the order of 1 to 15 mm. The glass beads provide a large surface area for binding with the cementitious material 3.

However, in order to enhance the natural adhesion between the glass beads 4 and cement 3 an adhesive is added which has the effect of chemically abrading or etching the smooth surface of the glass beads to provide proper adhesion. The adhesive is either a powder or liquid comprising a mixture of a silicone and a concrete fortifier. The concrete fortifier retards the set so to compensate for this, the silicone accelerates the set. The concrete fortifier fortifies the cement mix, increases hardness, durability, bonding capability and chemical resistance to alkalinity bleed from the glass beads. The surface finish is prepared by mixing the cementitious material with the glass beads in a slurry which is formed by adding water and an adhesive. Most of the glass beads are distributed throughout the slurry to ensure consistent structural integrity of the surface finish matrix.

Ideally, the outer surface 5 of the surface finish matrix is formed by glass beads near the surface which sit proud of the cementitious material. Ideally, the surface area presenting to and forming the outside of the surface finish would be 30% to 60% of the surface area of each bead but preferably closer to 60%. Thus, 30% of the beads along the surface 5 would be visible above the surface upon completion of the finish. The proportion of the glass beads which are exposed is determined largely by the amount of washing of the surface prior to final setting of the surface finish. This has the effect of washing away the layer of mortar nearest the outside thereby exposing the glass beads close to the surface of the matrix. The glass beads interlock within the matrix providing resistance against various forces applied to the surface finish such as tensile, compressive or bending forces enhancing the structural integrity of the finish. The interlocking also prevents the tendency of glass beads to spall off from the matrix thereby preserving the integrity of the surface finish. According to a preferred embodiment, the bead sizes throughout the matrix are varied. For instance, for a particular surface finish one may choose beads from the sizes 1, 3, 5, 8, 10, 12 and 15 mm whereby the smaller diameter beads would assume the spaces between the larger diameter beads in a given finish thereby enhancing the interlocking between—the beads. According to one embodiment, the surface finish would have a ratio of cementitious material to glass beads of 1:1.

Alternatively, the ratio would be 5:4. The color of the cement mortar which is used determines the color transmitted by the glass beads. As the beads are clear they are internally reflective. If white cement is used, the glass beads tend to reflect a white color, whereas if a darker cement such as grey is used, the bead reflection would be grey. Thus, the beads reflect the color of the cement that is used. In another embodiment a mixture of colored beads may be used so that a mixed color effect is achieved.

In an alternative embodiment, the matrix is prepared by selecting in addition to the glass beads aggregates selected from earth materials such as semi precious gems, precious gems, sands or quartz, marble and pebble aggregates.

Preferably, beads mixed with other aggregates should be mixed with substantially the same size aggregate as the beads to achieve proper grading within and adequate strength of the matrix. For instance, if a 3 mm bead size is chosen as the predominant bead, then if there is to be used an additional aggregate material, a 3 mm size aggregate should be chosen. In an alternative embodiment, the proportion of the cementitious material may be greater than the proportion of glass beads by weight with the selection of proportions dictated by the particular application of the surface finish. To enhance adhesion between the glass beads and the cement an adhesive is introduced. In addition to the adhesive, other admixtures are used according to the properties of the surface finish required. The ratio of admixture to cement used would preferably be in the region of 250 ml to 40 kg by weight of cement.

The proportions of the mixed constituents which make up the matrix are determined according to the particular application and appearance required for the surface finish. Thus, examples of blends would be 50% glass beads to 50% selected aggregate such as pebbles, 75% glass bead to 25% gem stones, 70% glass bead to 30% gem stones. Bead or aggregate ratio selection depends on the surface finish required. Thus, the ratio is essentially determined by choice for a particular proportion of bead required to be seen prominently on the surface of the mix.

When the surface finish is used in structures in contact with water, a water proofing additive is desirable. The water proofing agent should be of the cementitious crystalline type that chemically controls and permanently fixes non-soluble crystalline growth throughout the capillary voids of the cement. The admixture should be used to permanently waterproof structures either above or below ground where water ingress is a predicted problem. The adhesive may also act as a concrete fortifier. The weight of the admixture per cubic meter of surface finish is determined according to the level of water pressure to which the structure is likely to be subjected. Furthermore, where the waterproofing mixture is used, the amount of water required for the slurry—will reduce by 5 to 20 liters per cubic meter depending on the dosage rate and mix design. The water proofing admixture can also act as a set retardant.

Thus, when a water proofing admixture is used precautions must be used to adjust the mixture to accommodate the effects that the water proofing admixture has on the matrix.

The waterproofing admixture which may also be a fortifier which also has the advantage of increasing adhesive strength and bonding although in doing this it slightly retards the setting time but as indicated, this is compensated for by the use of a silicone which has an accelerating effect on setting of the cement.

Figure 2:
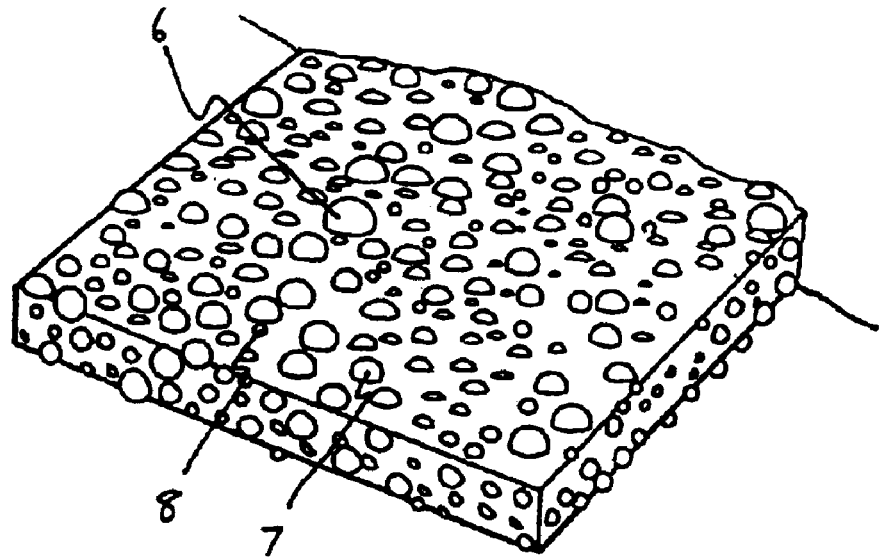
FIG. 2 shows the surface finish according to an alternative embodiment of the invention wherein different size glass beads are used.

FIG. 2 shows an alternative embodiment of the invention this time showing the surface finish containing beads of varying sizes. Thus, beads 6 fall in the upper end of the size range, beads 7 in the middle and beads 8 in the lower end. These beads may be spherical and regular or irregular.

Figure 3:
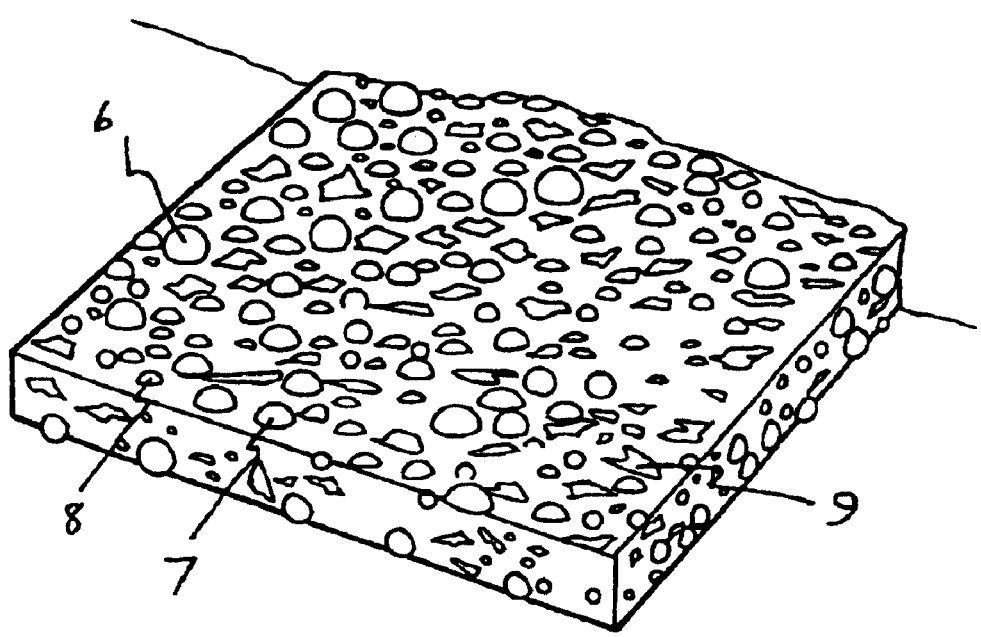
FIG. 3 shows an alternative embodiment of the finish including other selected aggregates.

FIG. 3 shows the finish formed with beads of different sizes as in FIG. 2 however, in this embodiment the finish also includes a non glass aggregate 9 blended with aggregates 6, 7 and 8.

According to the method aspect, the invention may be realized by applying various methodological steps according to the selected mixture and application to which the surface finish will be put.

In the most rudimentary form a mix may be achieved by manual hand mixing such as in a bucket or wheelbarrow or by manual mixing on a flat surface. This is suitable for small applications but for larger applications a mechanical mixing device should be used.

Preferably, a paddle mixer is used such that the paddles are set off the barrel bin with hard plastic blades attached to the end of the paddle to scrape and clean the bowl. This prevents crushing of the glass and grinding of the beads by the paddles against the barrel resulting in crushing and degradation of the beads. Where a finish is to be applied to a vertical surface, certain additional preparatory steps are required. First the surface of the substrate is laid with a patch coat which seals the substrate material from unwanted bleed out. The patch coat comprises a slurry including a silicone, concrete fortifier, cement and water but no aggregate. This mix must be mixed to the required paste consistency to ensure binding to the substrate.

Following this, the full mix is applied comprising cement, water, adhesive and selected glass beads and if required, other aggregates. According to a preferred embodiment of the method aspect, the invention involves the following steps: a) selecting a suitable cementitious material of a predetermined coloration; b) selecting glass beads of a size within the range 0.1 to 200 mm, mixing an adhesive into water for mixing with the glass beads and cementitious material progressively adding the water to the mix during mixing until a slurry is formed at a predetermined consistency suitable for the selected laying application; c) applying the matrix so formed to the surface of a structure; d) allowing the matrix to soft set for a predesignated period; e) washing away part of the cementitious material such that 30% to 60% of the surface area of a substantial number of glass beads on the finished surface are exposed; f) allowing the matrix to hard set.

In an alternative embodiment the additives are introduced into the mix at the mixing step which additives are selected from set retardants, plasticizers, and adhesives. The nature of the additive selected would be determined according to the application for the surface finish.

According to one embodiment of the method aspect, the mixture may also include the addition of aggregates selected from precious or semi-precious gems, sands crushed quartz, marble or pebbles. These aggregates may be introduced during the early mixing phase when a slurry is formed or alternatively, a selected aggregate may be broadcast on the surface finish just after laying and either before or after washing of the surface to expose the glass beads. The recommended method is however, to mix the aggregate selected with the matrix so the design consistency of the finish is assured.

There are a large variety of applications to which the surface finish may be put. Once the matrix is mixed to the required consistency, it may be applied by hand according to rendering techniques either to horizontal, vertical and indeed surfaces of almost any shape. One application of the finish is in surfacing of swimming pools, in which case waterproofing additives are required to be included in the matrix.

As an alternative to the use of mortar it is possible to utilize vinyl based resins which may either be rolled onto a surface by hand, (called hand laminating) or alternatively sprayed with a suitable gun under air pressure. According to this application the gun sprays the beads, a catalyst and resin at once, leaving the beads to set in the clear finish formed on the surface.

As an alternative to the above described method aspect, it is possible to form tiles once the matrix has mixed and set. Thus, rather than immediately applying the surface finish after the required consistency is achieved upon mixing, the mixture can be placed in a mold and allowed to set thereby forming a tile which can later be used as a surfacing material over a structural or non-structural substrate such as prefabricated or precast panels for use in the building industry including high rise.

Where the surface finish is applied by use of a gun, the surface to which the finish is to be applied has an adhesive membrane applied to its surface to provide support for the glass beads and resin mixture when sprayed on under air pressure.

The beads used in the various applications of the present invention are made of glass. The main ingredient is silica, sand, soda ash and limestone. These are generally weighed during manufacture and mixed with minor ingredients such as metal oxides. The most commonly used beads are made from recycled glass and are spherical or irregularly shaped.

Tinting of the glass beads may be achieved by mixing coloration or by incorporating fine particles of metal such as gold or magnesium in the beads. Gold or magnesium will provide a red bead. Cobalt will provide a blue bead.

Although the preferred shape for the glass beads is spherical it will be appreciated that other shapes may be used in the surface finish according to requirements. Such bead shapes would include for example, elliptical, oval, pear, rectangular, triangular, cylindrical, prismatic, hexagonal, octagonal and other similar shapes.

The methodology of the present invention is particularly adaptable to pre-cast fabrication whereby pre-cast structural members such as concrete panels which are cast in situ in factories may have applied to them the surface finish according to the present invention and its various embodiments. Thus, the surface finish can be applied to building panels which may either be structural or cosmetic, molded off site and prepared with the surface finish prior to delivery. Apart from structural panels, panels may also be manufactured including the surface finish when used for pavings, slabs, stepping stones, brick and tile pavers, floors, wall decorations.

According to one method of prefabrication, the surface finish is applied while the concrete which forms the prefabricated panel is still wet. The bead finish is then applied to the still wet panel enabling the panel and the surface finish to combine in the one setting process. This allows the surface finish to be integral with the setting and enhances the overall structural integrity of the substrate.

Another application of the present invention is in the manufacture of bead sheeting which involves applying the surface finish according to the invention and its embodiments to netting, paper, synthetic, metal wooden or other surface. Once the surface finish sets, the sheeting which forms the substructure surface finish may then be attached to a structure using an adhesive according to the surface to which the sheeting is to be adhered. The bead sheeting or bead netting is applied to an existing structure using waterproofed siliconized adhesive.

Synthetically based or cementitious based adhesive is used depending on the material or surface to which the sheet is to be adhered. Thus, the surface finish according to the invention and its various embodiments has numerous applications in building and industry.

Among the applications are the use of the surface finish for reflective purposes and this is particularly useful in safety applications such as in mines, on roads and roadside structures, airports for runway markings, on entrances to tunnels, platform edging and for outlining structures for night attention. Thus, the substrates to which the surface finish of the present invention may be applied are limited only to those having finish compatible surfaces and include a variety of materials surfaces and objects. Depending upon the substrate material selected, a suitable adhesive is chosen or alternatively the substrate surface is prepared in order to receive and support the glass bead surface finish. The film may also be used in maritime applications for instance, in illuminating dangerous rock outcrops, channel markings, pole markings, ferry wharfs and entrances where reflective materials are required.

Yachts, boats, ships, etc. which require permanent reflective safety marking may also have the finish applied. Other maritime applications include marker boys, color coding of moorings, night illumination of ferry's, private wharfs, pontoons and obstructions in maritime waterways. Other maritime applications include safety markings for wetsuits and surf boards.

The glass beading may also be used in furniture applications including table tops, lounges and other items of furniture.

Other building applications include use of the surface finish for driveways, paths, courtyards, interior and exterior floors, garden edging, on retaining walls, stepping stones and other applications where safety is required.

The glass beads are generally supplied by weight in quantities according to predetermined proportions of bead sizes. As an example it is possible to obtain a bag of beads including 10% glass beads, size 1.4 mm, 20% bead size 1.7 mm and 70% bead size 2 mm; as another example, a prepared bag mixture may contain 10% beading at 2.8 mm, 20% at 3.3.5 mm and 70% at 4 mm. In a further example, a mix bag of glass beads may include 10% at 2.3, 6 mm, 20% at 2.8 mm and 70% at 3.35 mm.

It will be recognized by persons skilled in the art that numerous variations and modifications may be made to the invention as broadly described herein without departing from the overall spirit and scope of the invention.

That which is claimed is:

1. A method for preparing and applying a surface finish on a substrate comprising at least one of a vertical surface, a horizontal surface and a sloped surface, the method comprising the steps of:
   a) selecting a cementitious material,
   b) selecting glass beads from within a size range of 0.1 mm to 200 mm,
   c) mixing the cementitious material with the selected glass beads, water and an adhesive including a concrete fortifier and a silicone until the mix reaches a consistency commensurate with application to the substrate,
   d) applying the mixture to the substrate,
   e) prior to hard setting of the mixture on the substrate, washing away a part of the cementitious material to expose a portion of the glass beads embedded in the cementitious material, such that 30% to 60% of a surface area of each of the exposed glass beads on the surface of the mixture is exposed, and
   f) allowing the mixture to hard set.

2. The method according to claim 1 comprising a step of adding during the mixing step at least one admixture selected from the group consisting of set retardants, waterproofing agents, bleed protectors, additional adhesives or set accelerators.

3. The method according to claim 2 comprising the steps of:
   a) selecting at least one additional aggregate from the group consisting of precious gems, semi-precious gems, sand, crushed quartz, marble pieces and pebbles,
   b) mixing the selected at least one aggregate into the mix during the mixing step and prior to the step of allowing the mixture to hard set and the applying step to, and
   c) dispersing the selected at least one aggregate into the mixture following the step of washing away part of the cementitious material.

4. A method for preparing and applying a surface finish on a substrate comprising at least one of a vertical surface, a horizontal surface and a sloped surface, the method comprising the steps of:
   a) selecting a cementitious material,
   b) selecting glass beads from within the size range of 0.1 mm to 200 mm,
   c) preparing a liquid solution of water and an adhesive, the adhesive comprising a concrete fortifier and a silicone,
   d) mixing the solution with the selected cementitious material and the selected glass beads until the mix reaches a consistency commensurate with application onto the substrate,
   e) applying the mix onto the substrate,
   f) exposing 30% to 60% of the surface area of each of the glass beads on the surface of the mix, and
   g) hard setting of the mix.

5. The method according to claim 4 wherein the step of exposing comprises washing away a portion of the cementitious material by hosing or sponging prior to the step of hard setting of the mix.

6. The method according to claim 4 wherein the step or exposing comprises the step of washing the surface of the finish with hydrochloric acid such that 30% to 60% of the surface area of a substantial number of the glass beads on the surface of the matrix is exposed following the step of hard setting of the mixture.

7. A method according to claim 4 involving comprising a step of, prior the step of applying, preparing the substrate by applying a patch coat comprising an additional cementitious material, water, a concrete fortifier and a silicone but not including an aggregate.

* * * * *